Jan. 14, 1969    R. C. CLARK    3,422,212
HOUSING STRUCTURE FOR ELECTRICAL DEVICE ADAPTED
FOR CRIMP CONNECTION TO CIRCUITS
Filed Aug. 3, 1967
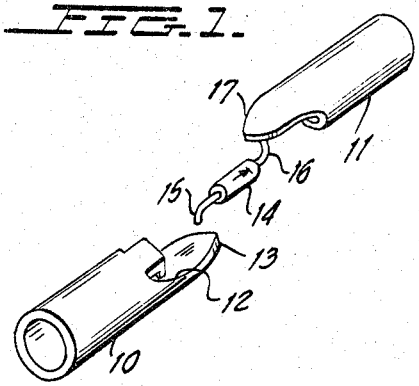
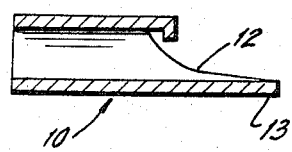
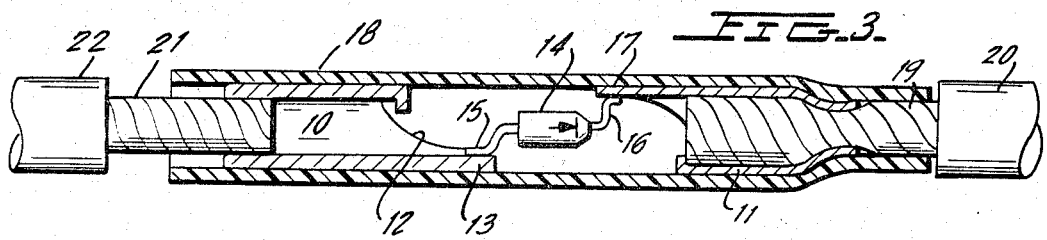
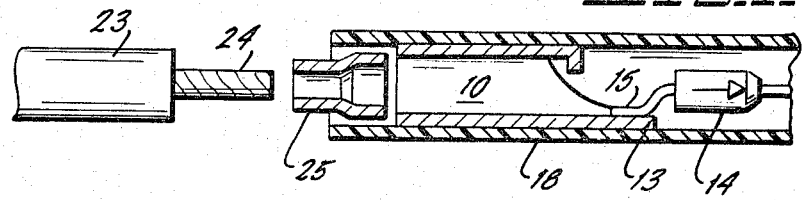
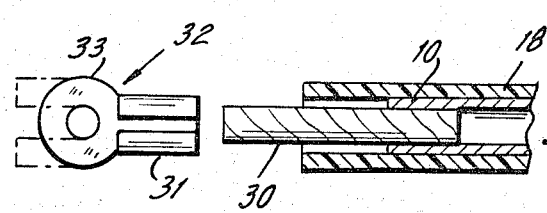
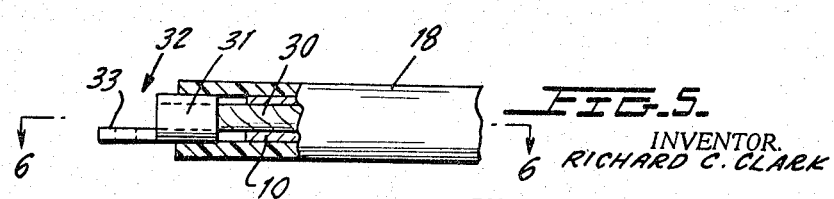
INVENTOR.
RICHARD C. CLARK
BY
OSTROLENK, FABER, GERB & SOFFEN
ATTORNEYS

# United States Patent Office 3,422,212
Patented Jan. 14, 1969

3,422,212
HOUSING STRUCTURE FOR ELECTRICAL DEVICE ADAPTED FOR CRIMP CONNECTION TO CIRCUITS
Richard C. Clark, Orange, Calif., assignor to International Rectifier Corporation, El Segundo, Calif., a corporation of California
Filed Aug. 3, 1967, Ser. No. 658,203
U.S. Cl. 174—52
Int. Cl. H05k 5/00
2 Claims

ABSTRACT OF THE DISCLOSURE

A housing construction for an electrical device, such as a diode, comprising two identical conductive tubes which are spaced from one another with their opposite ends connected to respective terminals of a semiconductor device. The two conductive tubes are held in spaced insulated relation by an outer insulation sleeve. The outer ends of each of the sleeves may then be crimped into connection with electrical conductors to place the semiconductor device in a particular circuit. One of the ends may be permanently crimped to a terminal connection lug.

---

This invention relates to a semiconductor housing structure, and more particularly relates to a novel auxiliary housing for receiving an electrical device, such as a diode, between two crushable conductive sleeves which are held in spaced relation by an insulation tubing, with the outer ends of each of the sleeves being crushable or crimpable into connection with lead wires. If desired, one of the ends may be permanently crimped to a connection lug for simplified connection to a terminal board or panel.

It is, therefore, a primary object of this invention to simplify the connection of any type of electrical device in a circuit by providing a support housing therefor with crimpable terminal ends.

Another object of this invention is to provide a standard wire splice or terminal connector which contains an integral electrical device.

Yet another object of this invention is to provide a novel means for a connection of a circuit component in a circuit solely by crimping.

These and other objects of this invention will become apparent from the following description when taken in connection with the drawings in which:

FIGURE 1 is an exploded perspective view of the spaced conductive crimpable tubes which have a diode connected between them.

FIGURE 2 is a cross-sectional view taken through the axis of one of the tubes of FIGURE 1.

FIGURE 3 is a cross-sectional view of the tubes of FIGURE 1 in connection with their electrical device, and an insulation support sleeving, and further illustrates one end crimped to an electrical lead.

FIGURE 4 illustrates the left-hand end portion of FIGURE 3 in combination with an adaptor insert for permitting connection to a small diameter lead wire.

FIGURE 5 is a plan view of the left-hand end of a device similar to FIGURE 3, which is permanently connected to a terminal lead.

FIGURE 6 is an exploded cross-sectional view of FIGURE 5 taken across the section line 6—6 in FIGURE 5.

Referring first to FIGURES 1, 2 and 3, there is illustrated two identical conductive tubes 10 and 11 which may be of brass nickel plated material, having outer diameters of .200 to .375 inch, a wall thickness of .020 to .060 inch, and a mean length of about .500 inch.

As best seen in FIGURE 2, each of tubes 10 and 11 are identical to one another and have a generally circular cut 12 which defines an extending connection section 13 for receiving the terminal and any desired electrical device. For example, in FIGURES 1 and 3, a diode 14, having leads 15 and 16, is connected in series between tubes 10 and 11 by soldering or brazing of leads 15 and 16 to extending sections 13 and 17 of tubes 10 and 11, respectively. After the connection of the device 14 in series with tubes 10 and 11, they are inserted in a suitable insulation tube 18, as shown in FIGURE 3, which may be a semi-rigid insulation tube. Preferably, the sleeve 18 will be slightly flexible and could be of nylon or polyvinylchloride to prevent cracking thereof after a crimping operation. The sleeve could have a length of about 1.50 to 2.00 inches, leaving about .125 inch of the ends extending beyond the opposite ends of tubes 10 and 11. To prevent accidental contact between members 10 or 11 to any other conductor or ground, the extending connecting portions 13 and 17 are rotated 180° with respect to one another, as shown in FIGURE 3.

The completed device then forms a novel component which can be connected in an electrical circuit by crimping the outer ends of tubes 10 and 11. Thus, as shown in FIGURE 3, the outer end of member 11 is crimped on to lead 19 of conductor 20. The end 21 of a second conductor 22 is also illustrated in FIGURE 3 prior to its insertion in tube 10, and the crimping of tube 10.

An adaptor may be used where the interior diameter of tubes 10 and 11 are excessively greater than the diameter of the lead wire to which they are connected. For example, in FIGURE 3, wires 20 and 22 may be about No. 16 AWG.

Where the wire size is about from No. 26 to No. 30 AWG and is shown by wire 23 in FIGURE 4 having an exposed lead 24, an adaptor insert 25 may first be placed on lead 24, then inserted into tube 10 which is thereafter crimped to the wire 24 and adaptor 25, thereby to complete the connection.

The novel arrangement of the invention may also form a standard lug-type terminal which has a doide or other suitable circuit element in series therewith. For example, FIGURES 5 and 6 illustrate the left-hand end of the assembly of FIGURE 3 where an adaptor wire 30 telescopes into the left-hand end of conductive tube 10 and into cylindrical body portion 31 of a standard connection lug 32 having a connection tang 33. Clearly, lug 32 can have any desired standard shape. The tube 10 is then crimped to make good electrical connection with adaptor 30 and portion 31, thereby forming a unitary terminal lug structure having a circuit element connected directly in series therewith.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. An electrical device housing crimpable at either end comprising; first and second identical hollow conductive tubes; an electrical device; and an insulation sheath of plastic material; said first and second conductive tubes positioned coaxially within said insulation sheath and secured to said insulation sheath; the adjacent ends of said first and second tubes spaced from one another; said electrical device having first and second leads, respectively, connected to said adjacent ends of said first and second tubes; said electrical device contained within said insulation sheath; the outer ends of said first and second tubes being crimpable into engagement with electrical conductors; said adjacent ends of said conductive tubes having a bias cut defining extending surface portions extending from one side of said tubes; said electrical device leads connected to said extending surface portions; said extending surface portions rotated 180° from one another.

2. The electrical device of claim 1 which includes a terminal lug having a tubular body and an extending flat terminal extending from said tubular body; said tubular body inserted into said outer end of said first conductive tube and permanently electrically and mechanically connected thereto.

References Cited

UNITED STATES PATENTS 3,291,894  12/1966  Sampson _____ 174—52

DARRELL L. CLAY, *Primary Examiner.*

U.S. Cl. X.R.

29—628; 174—84; 317—99, 234; 338—322; 339—223, 276